(12) United States Patent
Craig et al.

(10) Patent No.: US 8,408,849 B2
(45) Date of Patent: Apr. 2, 2013

(54) PRESSURE-ACTIVATED ID GROOVING TOOL

(75) Inventors: Karen Anne Craig, Greensburg, PA (US); Anthony Paul Sones, Friendswood, TX (US)

(73) Assignee: Kennametal Inc., Latrobe, PA (US)

( * ) Notice: Subject to any disclaimer, the term of this patent is extended or adjusted under 35 U.S.C. 154(b) by 462 days.

(21) Appl. No.: 12/816,145

(22) Filed: Jun. 15, 2010

(65) Prior Publication Data
US 2011/0303057 A1    Dec. 15, 2011

(51) Int. Cl.
B23B 29/034    (2006.01)
(52) U.S. Cl. .......................................... 408/158; 82/1.2
(58) Field of Classification Search ........... 82/1.2, 82/1.4, 1.11, 70.1, 82, 88, 113; 408/153, 408/158, 161, 168; 74/53, 55; 15/104.011, 15/104.012
See application file for complete search history.

(56) References Cited

U.S. PATENT DOCUMENTS

| 2,038,611 | A |   | 4/1936  | Simonson             |        |
|-----------|---|---|---------|----------------------|--------|
| 2,247,284 | A | * | 6/1941  | Young                | 82/1.2 |
| 2,333,935 | A |   | 11/1943 | Jones                |        |
| 2,545,443 | A |   | 3/1951  | Bowren               |        |
| 2,869,404 | A | * | 1/1959  | Condrac              | 82/1.2 |
| 3,299,749 | A | * | 1/1967  | Koppelmann           | 82/1.4 |
| 3,625,625 | A | * | 12/1971 | Van Roojen et al.    | 408/158 |
| 4,067,251 | A |   | 1/1978  | Eckle et al.         |        |
| 4,841,636 | A |   | 6/1989  | Huggins, Sr.         |        |
| 5,095,785 | A | * | 3/1992  | Noggle               | 82/1.2 |
| 5,120,167 | A | * | 6/1992  | Simpson              | 408/158 |
| 6,331,093 | B1 | * | 12/2001 | Graham et al.       | 408/1 R |
| 6,655,883 | B2 | * | 12/2003 | Maar                | 408/158 |
| 6,846,136 | B2 | * | 1/2005  | Brock et al.        | 408/154 |
| 6,857,344 | B1 |   | 2/2005  | Diller              |        |
| 7,089,837 | B2 | * | 8/2006  | Feil et al.         | 82/1.4 |
| 7,699,567 | B2 | * | 4/2010  | Nedzlek             | 408/158 |
| 2005/0150336 | A1 |   | 7/2005 | Cambrey             |        |

FOREIGN PATENT DOCUMENTS

| DE | 4022579 A1     | 7/1990  |
|----|----------------|---------|
| DE | 102007060500 A1 | 6/2009 |
| EP | 0187647 A2     | 7/1986  |
| EP | 0291933 A      | 11/1988 |
| EP | 1123765 A1     | 8/2001  |
| GB | 2481311 A      | 12/2011 |
| GB | 2481312 A      | 12/2011 |
| JP | 52003792 A  *  | 1/1977  |
| JP | 08071811 A     | 3/1996  |
| JP | 2003205407 A   | 7/2003  |
| WO | WO-9614181 A   | 5/1996  |

* cited by examiner

*Primary Examiner* — Daniel Howell
*Assistant Examiner* — Nicole N Ramos
(74) *Attorney, Agent, or Firm* — Larry R. Meenan, Esq.

(57) ABSTRACT

A pressure-activated ID grooving tool includes a tool body having a channel, a front cross slide slot, a rear cross slide slot projecting, and two legs extending from a piston bore. A piston is disposed within the piston bore. A slide arm has an extension face and a retraction face. A cross slide has a cross slide pocket with a slide engaging face immediately opposing the extension face of the slide arm and a slide retracting face immediately opposing the retraction face of the slide arm. When fluid within the channel and the piston bore is pressurized, the piston moves toward the plunger, which in turn causes the extension face of the slide arm into contact with slide engaging face of the cross slide to cause the cross slide to move in an outward radial direction, thereby pushing the insert into contact with a workpiece.

5 Claims, 5 Drawing Sheets

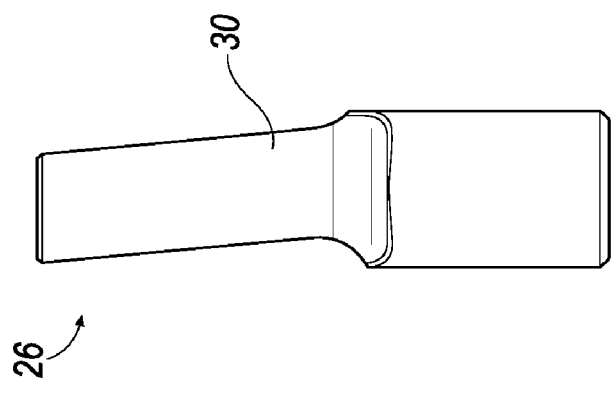
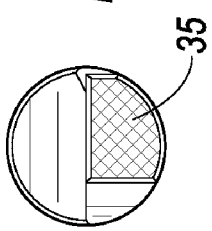
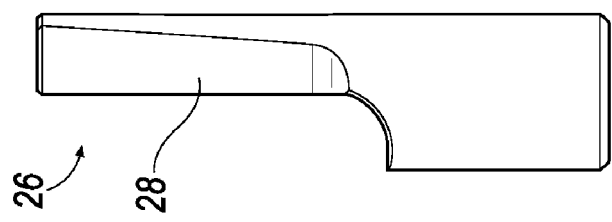
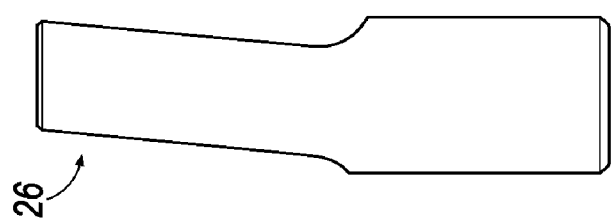
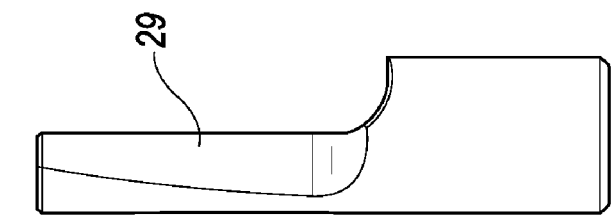

PRESSURE-ACTIVATED ID GROOVING TOOL

CROSS-NOTING TO RELATED APPLICATIONS

This application is related to application Ser. No. 12/816,169 filed Jun. 15, 2010 entitled "Mechanical-Activated ID Grooving Tool".

BACKGROUND OF THE INVENTION

1. Field of the Invention

The invention relates to machine tools used to cut inside grooves in a hole of a work piece.

2. Background of the Invention

It is often necessary or desirable to create an internal recess or groove within a tube or hole of a machine part. This process is accomplished using a grooving tool attached to a tool holder on a rotary drive. The end of the grooving tool that is placed in the hole has one or more cutting inserts. These cutting inserts are often radially extendable and retractable. This feature allows the tool to be inserted into a hole, then rotated and extended radially to form the groove along the inside surface of the hole.

Extendable inserts are well known in the prior art. U.S. Pat. No. 2,333,935 and U.S. Pat. No. 2,545,443 each shows extendable inserts for internal grooving. Generally, a central rod is moved in an axial direction and has a tapered surface at its end. The tapered surface engages one or more cutting inserts in a wedging action to convert the axial force into a radial force moving the insert into cutting position. The means for moving the central rod is often mechanical, but electrical or hydraulic movement of such a rod is not new to the art. Regardless of the means for effecting movement, an elaborate control system was always required to control the movement of the central rod. This control is necessary because the position of the central rod determines the diameter of a cut that will be made in the wall of the workpiece. One object of this invention is to eliminate the need for a sophisticated means for controlling the central rod.

Current grooving tool technology is also limited by how far a tool is able to reach into a workpiece. The reason for this limitation in the art today is that the means of controlling the diameter of the cut must be in close proximity to the cutting insert. Another object of this invention is to create a grooving tool that is easily manipulated to cut at depths not previously possible.

A third object of this invention is to improve on the way in which a cutting insert is retracted. A problem of the current technology is the inability of an insert to retract after the cut is complete. Chips or debris interfering with the motion or spring failure can cause the insert to not retract. Most grooving tools now employ a spring to directly pull an insert back to a retracted position. A relatively strong spring is required to overcome the force required to pull an insert back into start position. Spring failure can be serious problem. Because the spring is often the only means of retaining the insert in the shank, failure of the spring can lead to the insert being stuck in an extended position and fouling itself in the workpiece. The present invention looks to alleviate the need for such a spring.

BRIEF SUMMARY OF THE INVENTION

The inventors have recognized the problems associated with conventional grooving tools and have developed an improved tool that remedies many deficiencies of the prior art. The grooving tool comprises a body having an internal piston. The piston interacts with a cross slide also inside the shank. A slide arm projects from the lower end of the piston. The slide arm has two outward facing surfaces and the cross slide has two inward facing surfaces. The piston fits within the slide so that outward faces of the piston correspond and are adjacent to the inward faces of the slide. The corresponding faces are all set at an acute angle in relation to the longitudinal axis of the shank. A cutting insert is mounted to the slide. This arrangement enables a wedge-like action to extend the slide, which cannot move axially, and insert outward when the piston moves axially toward the working end of the tool. Because the slide is fixed axially it must move radially according to the angled faces as the piston passes through it. When the slide and insert are extended the insert engages and cuts a groove into an interior surface of a hole in a workpiece.

Preferably, the piston is hydraulically driven toward the working end. The hydraulic fluid and pressure are provided by the coolant delivery system. When the coolant system is on, pressure is applied to a cavity within the shank to drive the piston which extends the insert into cutting position. When the coolant system is off spring pressure is applied to the piston to return it to start position.

The end of the tool opposite the shank has an end cap with a spring located therein. The spring is positioned to apply constant pressure axially on a plunger that engages the cap side of the piston/slide assembly. When coolant pressure is on, the spring is compressed and the insert is extended. When coolant pressure is off the spring pushes the piston back towards the non-working end of the tool. The axial motion of the piston causes the slide to move radially and the insert is retracted.

When the insert is extended and in cutting position the feed rate of the cutting insert is controlled by the geometry of the insert. Each insert has a cutting edge and a heel section. The heel section trails the cutting edge and acts to prevent over feeding. Additionally, an adjustment screw is incorporated into the end cap to limit the travel of the piston once a maximum cutting diameter is reached.

BRIEF DESCRIPTION OF THE DRAWINGS

Further features of the present invention, as well as the advantages derived therefrom, will become clear from the following detailed description made with reference to the drawings in which:

FIG. 4a-e are various perspectives of the slide arm and piston; and

DETAILED DESCRIPTION OF THE INVENTION

Figure 1:
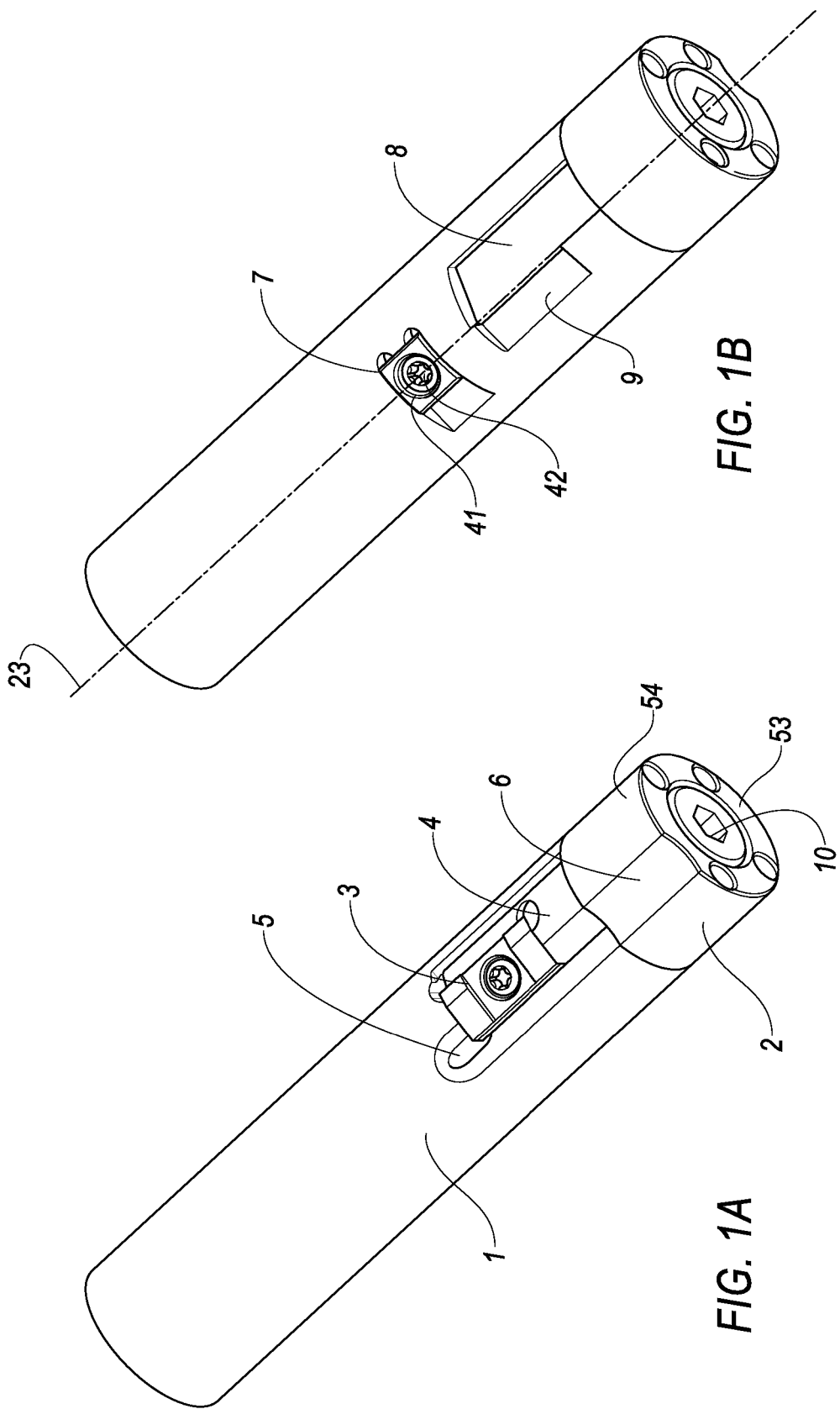
FIGS. 1a and 1b show perspective views of two sides of the exterior of the tool.
Figure 2:
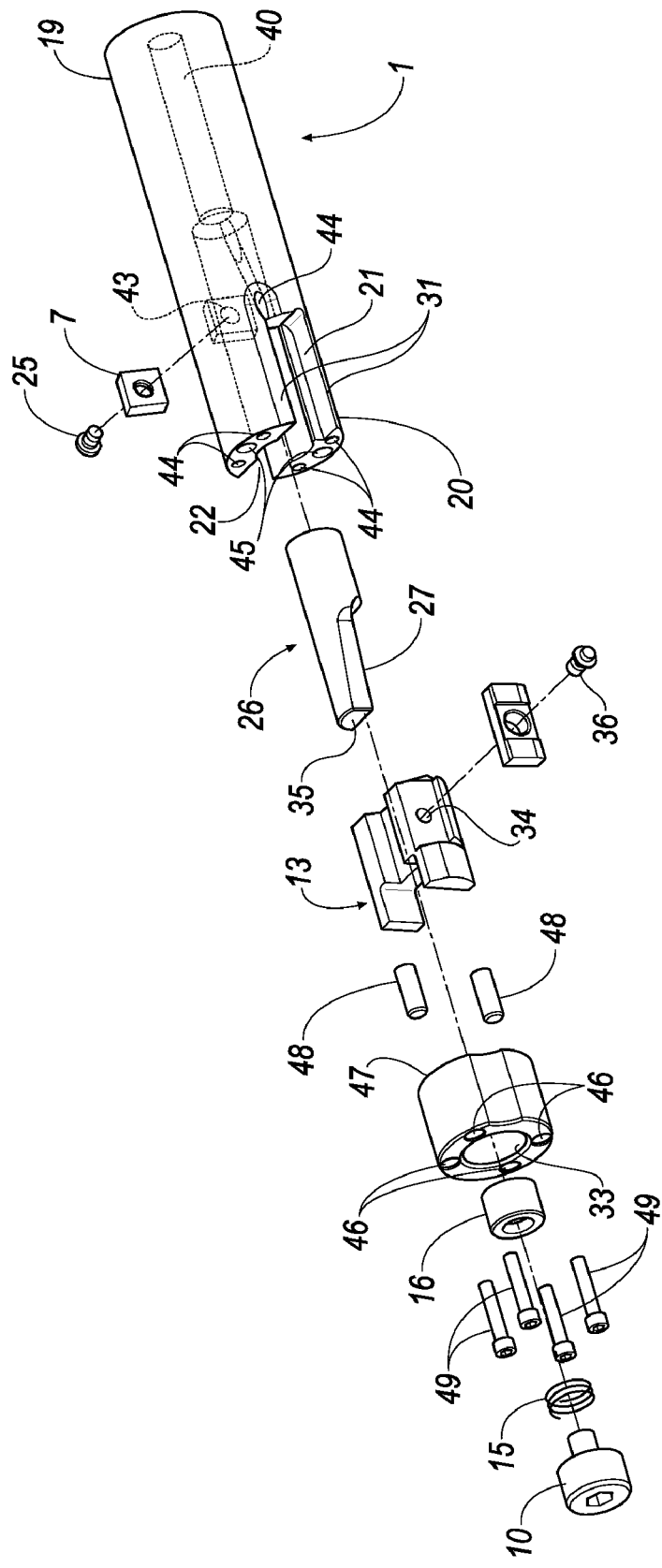
FIG. 2 is an exploded view of the tool.

Referring to FIG. 1, the tool consists of a generally cylindrical tool body 1 that houses the various parts of the apparatus. A central longitudinal axis 23 runs throughout the tool. The tool body 1 has a shank end 19 and a working end 20 as shown in FIG. 2. The shank end 19 is the portion of the tool holder that connects to an extension, collet or chuck (not shown). Two diametrically opposite slots are located in the working end 20, a front cross slide slot 21 and a rear cross slide slot 22. The slots are both open to the working end 20 and extend a short distance toward the shank end 19.

Within the tool body 1 is a channel 18 spanning from the shank end 19 to a point at which the channel 18 transitions to a larger piston bore 24. The piston bore 24 extends toward the working end 20 of the tool holder 1 to a plane adjacent the closed ends of the slots 21, 22. The channel 18 and piston bore 24 provide a fluid path from the rotary tool to the working end 20. Both the channel 18 and the piston bore 24 are generally cylindrical and disposed about a central longitudinal axis 23. The diameter of the channel 18 and the diameter of the piston bore 24 are matters of hydraulic design commonly known in the art. Two legs 31 define the remainder of the tool body 1 from the piston bore 24 to the working end 20. Each leg is radially disposed between the slots 31 so that a central cavity is formed between the legs 31.

A piston 26 is positioned inside of the piston bore 24 of the tool body 1 as seen in FIG. 3. Extending from the piston 26 towards the working end 20 is a slide arm. FIGS. 4a-4f best show the geometry of the slide arm 27. The slide arm 27 has two parallel sides. One parallel side being an extension face 28 and the other side a retraction face 29. The distance between the parallel sides 38, 39 is less than the diameter of the tapered piston 26 and the parallel sides 38, 39 are set at an acute angle θ relative to the central longitudinal axis 23. A third side of the slide arm 27 is an arm center face 30. The arm center face 30 is perpendicular to each of the parallel sides and lies in a plane that includes the central longitudinal axis 23. A fourth surface, opposite the arm center face 30 and of the same radius as the tapered piston 26, spans between the two parallel surfaces. It should be noted that the shape of the slide arm 27 described herein is limited only by the need for the two parallel surfaces 38,39 set at an angle relative to the central longitudinal axis 23. As will be described below, the interaction of these parallel surfaces with the remainder of the assembly is an important facet of the invention.

As can be seen in FIG. 3, the slide arm 27 interacts with a cross slide 11 having a cross slide pocket 13 congruently shaped to mate with the slide arm 27. The cross slide 11 has a front side 51 and a rear side 52. The cross slide spans the width of the tool body 1 and fits within the front and rear cross slide slots 21, 22. The front side 51 has a threaded slide bore 34 aligned perpendicular to the longitudinal axis 23. The cross slide pocket 13 is formed by a slide engaging face 12, a slide retracting face 14 and a slide center face 17 best seen in FIG. 2. The slide engaging face is adjacent to and facing the extension face 28 of the slide arm 27. The slide retracting face 14 is adjacent and facing the retraction face 29 of the slide arm 27. The slide center face 17 faces the arm center face 30.

As seen in FIGS. 2 and 3, an end cap 2 attaches to the working end 20 of the tool body 1 to retain the cross slide 11 in the front and rear cross slide slots 21, 22. The end cap 2 has a radial portion 54 and a flat portion 53. Within the flat portion 53 is an internally threaded hole 33. Threaded into the internally threaded hole 2 and centered along the longitudinal axis is an externally threaded adjustment screw 10. Projecting from the adjustment screw 10 and directed toward the shank end 19 is a spring guide 32. Around the spring guide 32 is a spring 15. A plunger 16 with an inner cavity 62 having geometry similar to the spring guide 32 is positioned on the spring guide 32 so that the spring 15 is compressed between the plunger bottom 61 and the adjustment screw 10. The plunger top 60 is in constant contact with the tip 35 of the slide arm 27. The tip 35 is the flat end surface of the slide arm 27 that projects from the cross slide pocket 13.

A self-feeding insert 3 with and insert hole 34 is attached to the front side 51 of the cross slide 11 with an insert screw 36 that threads into the slide bore 34 of the cross slide 11. The self-feeding insert is characterized by the presence of a lead cutting edge 39 and a trailing heel 38, both in contact with the workpiece. This arrangement allows for control of the amount of metal removed per revolution of the tool. The insert 3 also has side surfaces 59, lead surface 57, trail surface 58, top surface 55 and bottom surface 56. The bottom surface of the insert abuts to the cross slide 11. The top surface 55 is opposite the bottom surface 56. The slide bore 34 opens to both the top surface 55 and the bottom surface 56. The cutting edge 39 is the intersection of the top surface 55 and the lead surface. The heel 38 is a chamfered or radial surface at the intersection of the trail surface 58 and the top surface 55.

Figure 3A:
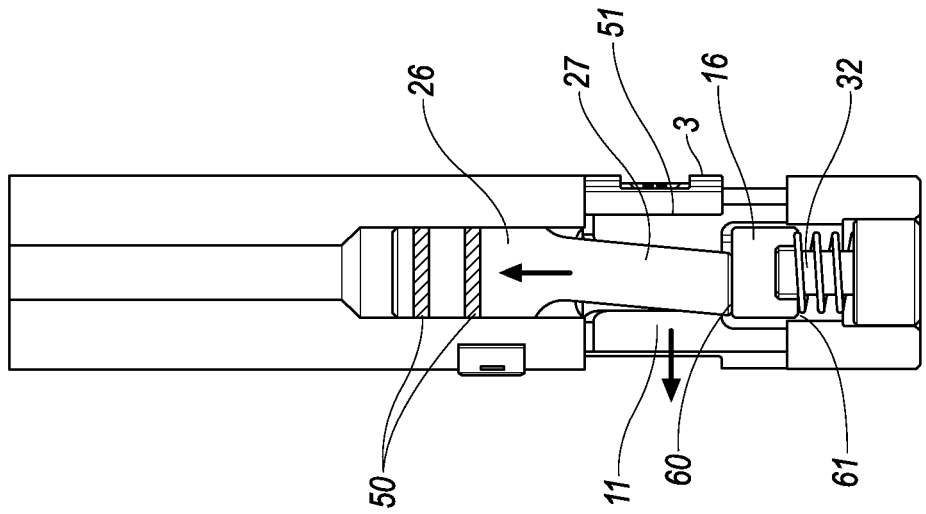
FIG. 3a is a cross section of the tool in the engaged position.
Figure 3B:
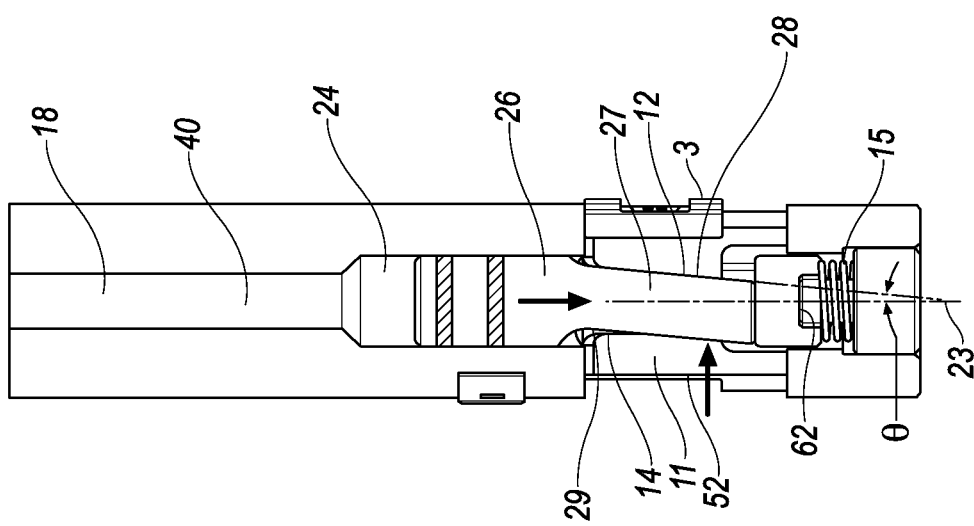
FIG. 3b is the same view in the retracted position.

Referring now to FIGS. 3a and 3b, the operation of the tool can be understood. Fluid 40 fills the channel 18 and piston bore 24. When this fluid 40 is pressurized it forces the piston 26 toward the plunger 16, which in turn compresses the spring 15 against the adjustment screw 10. The axial movement of the piston 26 and slide arm 27 causes the extension face 28 of the slide arm 27 into contact with slide engaging face 12 of the cross slide 12. Due to the angle of the surfaces and the inability of the cross slide to move axially, the contact forces the cross slide 11 to move in a radial direction proportional to the stroke of the piston. The cross slide 12 pushes the insert 3 into contact with the workpiece to begin cutting. When the fluid 40 is no longer pressurized the spring 15 engages the plunger 16 against the slide arm 27 to force the piston 26 back into the piston bore 24. The interaction between the retraction face 29 of the slide arm 27 and the slide retracting face 14 of the cross slide 11 causes the cross slide to retract. The mechanical advantage provided by the interaction of the retraction face 29 and the slide retracting face 14 ensures the insert will be withdrawn and the chance of fouling the workpiece will be reduced.

It should be noted that while the inventors consider hydraulic actuation to be the preferred method, other methods of actuating the slide arm 27 have been considered. Electric, pneumatic, and mechanical devices could all be used to move the slide arm axially and all are well known in the art. However, hydraulic pressure is preferred because it is already present and necessary to perform a cooling function on the tool. In addition, as will be detailed below, hydraulics makes depth adjustments of the tool simpler than would be necessary with any other actuation means.

Figure 5A:
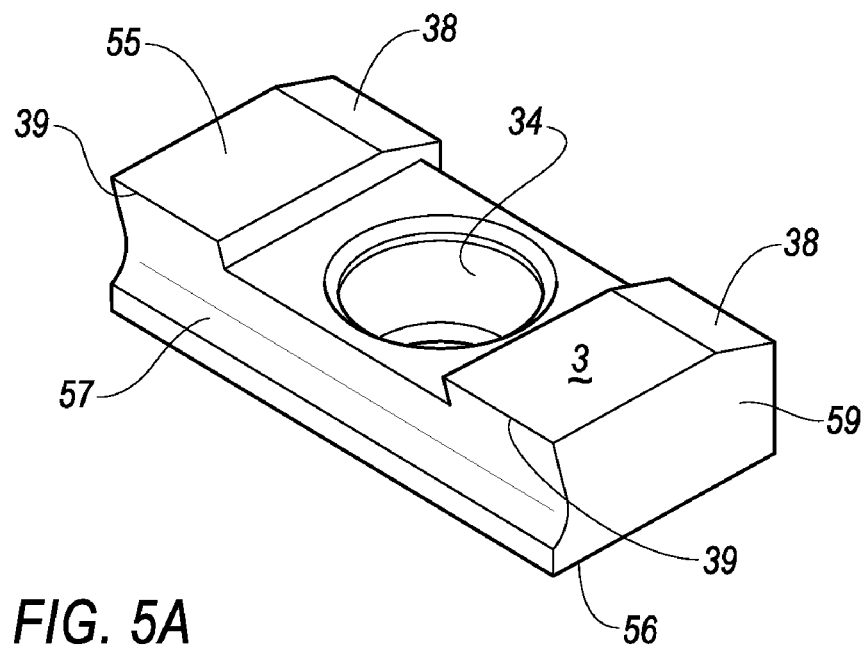
FIGS. 5a and 5b are perspective views of the self-feeding insert.
Figure 5B:
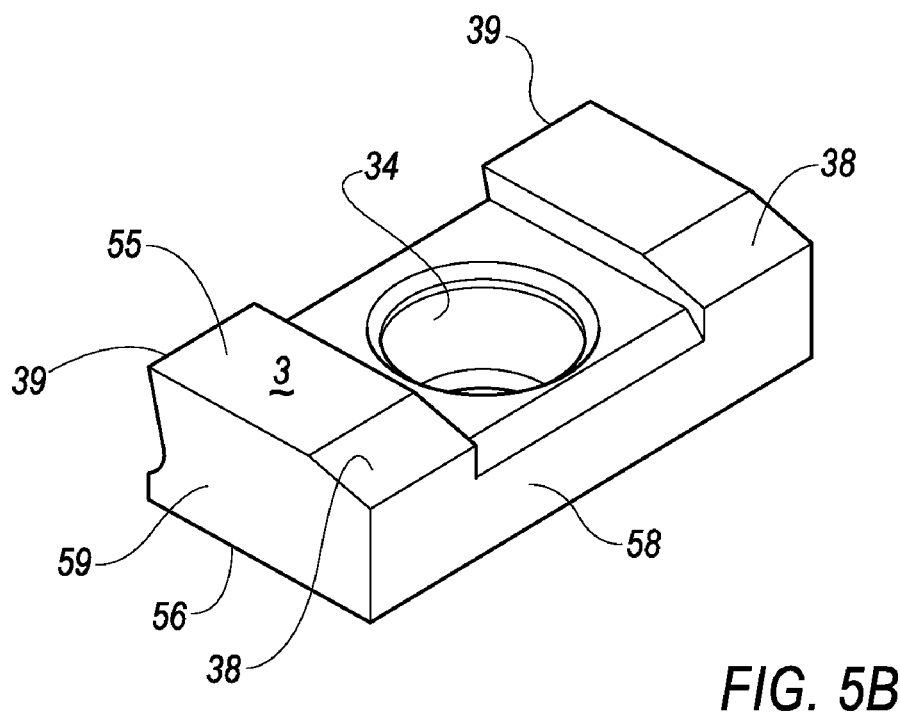

Because axial movement of the slide arm 27 controls radial movement of the cross slide 12 and insert 3, the adjustment screw 10 can be used to control final cut diameter. Adjusting the screw 10 toward the cross slide 12 restricts how far the slide arm 27 is able to push the plunger 16. In turn, the radial movement of the cross slide 12 is restricted and overall cut diameter of the groove is reduced. The reverse applies and the cut diameter of the groove is increased as the adjustment screw 10 is turned away from the cross slide 12. While the adjustment screw 10 is used to control the final cut diameter, the relationship between the cutting edge 39 and heel 38 (see FIG. 5) of the insert controls the cut depth per revolution of the tool. When extended the heel 38 and the cutting edge 39 are each located at different radii from the central longitudinal axis 23. This is due to the design of the top of the insert with a cutting edge 39 and heel 38. The radius of any portion of the heel 38 is always less than the radius of the cutting edge 39. The distance between the two radii is the cutting depth per revolution of the tool.

Using the knowledge in the paragraph above the inventors have also developed a method for machining grooves in a workpiece. Most grooving tools use a predetermined radial movement and feed rate of an insert in and out of a cut. This tool uses the cutting depth of the insert and number of spindle rotations to determine groove diameter. Cutting in this fashion has proven to be much faster than earlier methods.

The preferred embodiment of the invention includes all of the limitations described above as well as the following. The tool should have at least one wear pad 7 having a wear pad hole 41 attached to the tool body 1 by a wear pad screw 42 as seen in FIGS. 1 and 2. The tool body 1 has a screw hole 43 located 180° from the cutting edge 39 that the wear pad screw 42 threads into. The wear pad 42 acts to offset the cutting pressure of the insert 3. A chip gash 6 is a formed by an elongated longitudinal recess in the tool body 1 and the end cap. The chip gash 6 is centered on the cutting edge 39. The chip gash 6 spans the length of the radial portion of the end cap 2 and into the tool body 1 to an area just beyond the insert 3. Within the chip gash 6 in the area just beyond the insert 3 is a coolant hole 5, which is the terminal end of a coolant duct 44 (best shown in FIG. 2). The coolant duct 44 is a passage within the tool body 1 connecting the piston bore 24 to coolant hole 5 where coolant is delivered to the cutting area. The shank end 19 is connectable to an extension with a channel to reach deep hole applications that were not previously practical. The depth will only be limited the capabilities of the tool body itself since the hydraulic actuation will be unaffected by the length or number of extensions.

Around the piston 26 in the preferred embodiment are ring seals 50. The ring seals 50 keep fluid 40 from leaking past the piston 26 and causing pressure loss. The tool has performed adequately without the ring seals but use of the ring seals is preferred.

The extension face 28 and retraction face 29 of the slide arm 27 are set an angle between 1° and 15° and preferably at 5° relative to the central longitudinal axis 23. This arrangement provides an 11.5:1 mechanical advantage.

On the working end 20 of the tool body 1 there are three holes in each leg 31 projecting toward the shank end. Each leg has two threaded bolt holes 44 and one unthreaded alignment hole 45. The end cap 2 has four mounting holes 46 that align with the bolt holes 44 in the tool body. The end cap 2 also has two cap pin holes 47 that align with the alignment holes 45 of the tool body 1. An alignment pin 48 is insert into each alignment hole 45 prior to installing the end cap 2. Bolts 49 pass through the mounting holes 46 and into the bolt holes 44 to secure the end cap in place.

Another feature of the preferred embodiment is a gauging flat 9 shown in FIG. 1b. The gauging flat 9 is a flat area on the surface of the tool body 1 adjacent to the rear cross slide slot 22. The gauging flat 9 is an area on the tool on which a leg of an external micrometer can be positioned. By manually actuating the piston 26, the insert 3 can be extended. Positioning the micrometer on the cutting edge 39 of the insert 3 and the gauging flat 9 the final cut diameter of the tool can be calculated.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A pressure-activated ID grooving tool, comprising:
a tool body displaced about a central longitudinal axis having an annular geometry, said tool body having a shank end and a working end, said tool body having a channel formed therein spanning from the shank end to a piston bore, a front cross slide slot and a rear cross slide slot projecting from the working end toward the shank end, two legs extending from the piston bore to the working end, each leg radially disposed between the slots so that a central cavity is formed therebetween;
a piston disposed within the piston bore;
a slide arm extending from the piston toward the working end, said slide arm having an extension face and a retraction face forming an acute angle relative to the central longitudinal axis;
a cross slide disposed between the front and rear cross slide slots, said cross slide having a cross slide pocket formed therein, the cross slide pocket having a slide engaging face immediately opposing the extension face of the slide arm and a slide retracting face immediately opposing the retraction face of the slide arm;
an insert mounted on the cross slide,
an end cap attached to the legs;
an adjustment screw threaded into the end cap and having a spring guide projecting toward the shank end;
a spring coiled around the spring guide; and
a plunger fitted over the spring guide and in contact with the spring and the slide arm,
wherein, when fluid within the channel and the piston bore is pressurized, causes axial movement of the piston toward the plunger, which in turn causes the extension face of the slide arm into contact with slide engaging face of the cross slide to cause the cross slide to move in an outward radial direction, thereby pushing the insert into contact with a workpiece, and
wherein, when fluid within the channel and the piston is no longer pressurized, causes the spring to engage the plunger against the slide arm, which in turn causes the retraction face of the slide arm into contact with the slide retracting face of the cross slide to cause the cross slide to move in an inward radial direction, thereby withdrawing the insert away from the workpiece.

2. The grooving tool according to claim 1, wherein the insert comprises at least one cutting edge and at least one heel, wherein the cutting edge and the heel both contact a workpiece during cutting.

3. The grooving tool according to claim 1 further comprising at least one wear pad attached to the tool body at a point 180° from the cutting edge.

4. The grooving tool according to claim 2 further comprising a chip gash aligned with the at least one cutting edge and spanning longitudinally from an area just beyond the insert to the flat portion of the end cap, wherein a coolant channel spans from the piston bore to the chip gash to deliver coolant to the cutting edge of the insert.

5. The grooving tool according to claim 2 further comprising a gauging flat located on the tool body adjacent to the rear cross slide slot.

* * * * *